Dec. 11, 1951  J. W. JENSEN  2,578,067
AUTOMOBILE FISHING POLE HOLDER
Filed April 14, 1949
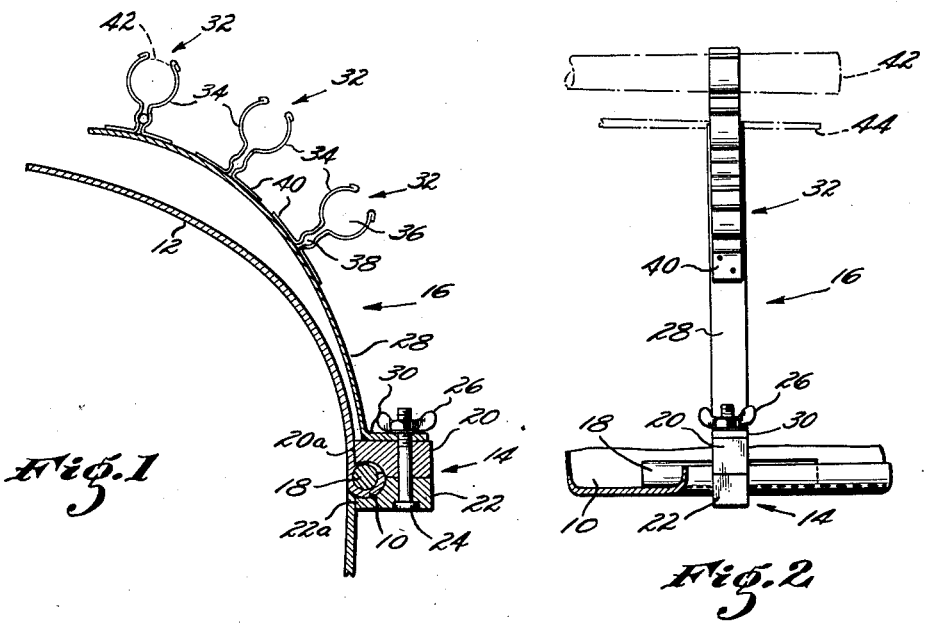
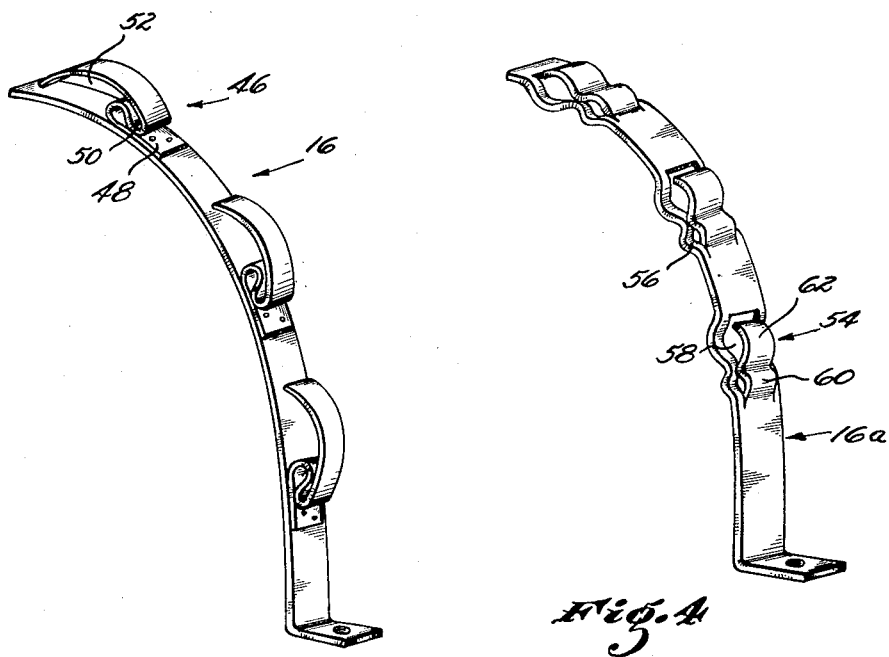
INVENTOR.
JOHN W. JENSEN
BY
Howard L. Johnson
ATTORNEY Patented Dec. 11, 1951

2,578,067

UNITED STATES PATENT OFFICE 2,578,067

AUTOMOBILE FISHING POLE HOLDER

John W. Jensen, Los Angeles, Calif.

Application April 14, 1949, Serial No. 87,477

2 Claims. (Cl. 224—42.45)

This invention relates to a fishing pole holder for attachment along the upper side edge of an automobile and more particularly to such a holder adapted to be clamped to the drain gutter which runs along a car just above the doors and side windows. By such mounting, a pair of my holders attached adjacent each end of the gutter may suspend between them a number of fishing rods in individual sockets provided on a suspension arm of each holder.

Various carriers for luggage, skis, etc. have been known for attachment to an auto top and some have been anchored to the drain gutters as well. However none of these have been constructed with a similar or interchangeable pair of supporting arms disposed above the auto top in such manner as to hold jointly therebetween a plurality of fishing poles in individual transverse sockets formed in the arms and automatically aligned along the auto top by means of their attachment to the drain gutter.

Thus my holder is unique in being able to be detachably secured to the drain gutter, with the fishing pole retaining-arm being supported apart from the vehicle body and the fishing poles being clipped or held on the outer face of this arm, so that neither can scratch or mar the finish of the auto body.

Other objects and advantages of the invention will be apparent from the following description and claims, the novelty consisting in the features of construction, combination of parts, the unique relations of the members and the relative proportions, disposition, and operation thereof, all as more completely outlined herein and particularly pointed out in the appended claims.

In the drawings which form part of the present specification:

Figure 1 is a transverse sectional view taken thru one form of my holder mounted on the side drain gutter of an auto;

Figure 2 is a side elevational view of the mounted holder with part of the drain gutter broken away;

Figure 3 is a perspective view of my retaining arm showing another form of pole-retaining clip; and Figure 4 is a similar view of another form of retaining arm and spring-clip.

My holder is here illustrated in association with the side drain gutter 10 along the top 12 of an automobile or other vehicle. Essentially my attachment consists of a clamp 14, an upwardly extending retaining arm 16 and a separate or loose anchor pin 18 adapted to lie along the drain gutter.

The clamp 14 consists of upper 20 and lower 22 jaws held together by a bolt 24 and nut 26 or other suitable means. The ends 20a, 22a of the jaws are vertically disposed so as to abut against the side of the vehicle, above and below the gutter respectively and the adjacent horizontal surfaces are curved to clamp upon the upper surface of the pin 18 and the lower surface of the gutter.

The present anchor pin 18 is cylindrical and of such dimensions as to conform more or less snugly to the inside of the gutter. In this connection it is particularly important to note (Fig. 2) that the length of the pin is considerably more than the width of the clamp jaws so that it extends (when placed in the gutter) on either side of the clamp. This serves both to contribute the properties of a solid rather than hollow structure at the point of attachment, as well as to reinforce the gutter against deformation on either side of the clamp. While a structure corresponding to the pin 18 could be attached or formed integral with the upper clamp jaw 20 to yield an analogous result, it is simpler to employ a separate pin as illustrated.

The retaining arm 16 consists of an upstanding portion 28 preferably curved inward to overlie the top of the car without resting against it so as not to scratch or mar the finish, and a lower, horizontally disposed apertured attachment tab 30 mounted over the bolt 24 and held securely against the upper face of the clamp by the nut 26.

In the form shown in Figures 1-2, there are attached to the upper or outer face of the retaining arm, successive engaging units 32 each composed of a pair of outwardly projecting fingers 34 curved to form jointly a larger 36 and smaller 38 socket therebetween. The pair of arms are formed of resilient material and are riveted, welded, or otherwise attached to the supporting arm 16 by oppositely bent terminal portions 40. Two such holders are secured near opposite ends of the drain gutter with the sockets of corresponding units 32 in longitudinal alignment so that a fishing pole will be received simultaneously, with its larger end 42 in the outer socket 36 and its smaller end 44 in the lower socket 38 of the opposite holder.

A different sort of spring clip 46 is seen in Figure 3, extending in the direction of the mounting arm 16 rather than outward therefrom. It consists of an attachment tab 48 secured to the support and bent back at its upper margin to form a minor 50 and major 52 socket for the fishing pole as before.

In contrast, the form of Figure 4 has a resilient engaging tongue 54 cut out of the supporting arm 16a and the latter bent into two successive grooves 56, 58 thereunder so as to form a pair of transverse sockets jointly with the oppositely bowed portions 60, 62 of the tongue. When not in use, the free upper end of the tongue may project thru the slot in the arm 16a from which it is cut. As before, the smaller socket is adapted to receive the lesser end of a fishing rod and the upper, larger socket to retain the butt end of another rod. The tongue being resilient, it engages the pole more-or-less snugly but still does not have to support all of its weight due to the pole also resting in the opposing recess. A tongue similar to 62 could likewise be attached to the arm 16 rather than being cut therefrom and sockets corresponding to 56 and 58 made in the rigid arm 16 if desired.

While I have shown and described in some detail several presently preferred embodiments of my fishing pole holder, it is to be understood that various modifications may be made in the construction and operation thereof within the spirit and scope of the subsequently claimed invention which it is my intention to claim broadly within the limitations imposed by the prior art.

I claim:

1. A fishing pole holder for detachable mounting on a vehicle, comprising in combination: a resilient arm adapted to overlie the top of said vehicle and spaced thereabove, and an opposing pair of clamp jaws at the lower end of the arm adapted to detachably engage the drain gutter of the vehicle, said arm being formed with a series of transverse sockets adapted to receive fishing poles therein and to be aligned with the corresponding sockets of a similar holder laterally spaced therefrom along said vehicle gutter so as jointly to support a fishing pole in each pair of aligned sockets.

2. The holder of claim 1 wherein said arm is bent over the top of the vehicle in successive steps, the individual steps having a resilient tongue extending outward therefrom toward the next step so as to retain a fishing pole between the arm and tongue.

JOHN W. JENSEN.

REFERENCES CITED

The following references are of record in the file of this patent:

UNITED STATES PATENTS

| Number | Name | Date |
| --- | --- | --- |
| 253,392 | Jones et al. | Feb. 7, 1882 |
| 316,062 | Riessner | Apr. 21, 1885 |
| 685,253 | Caldwell | Oct. 29, 1901 |
| 807,757 | Martin | Dec. 19, 1905 |
| 1,185,049 | Best | May 30, 1916 |
| 1,401,703 | Hyre | Dec. 27, 1921 |
| 1,894,083 | Chaney | Jan. 10, 1933 |
| 2,006,843 | Russell | July 2, 1935 |
| 2,400,058 | Concannon | May 7, 1946 |
| 2,461,897 | Hopkins | Feb. 15, 1949 |
| 2,514,266 | Walslager | July 4, 1950 |
| 2,536,797 | Cooke | Jan. 2, 1951 |